Feb. 18, 1936. L. L. DAVIS 2,031,253
OIL TESTING DEVICE
Filed Nov. 14, 1935
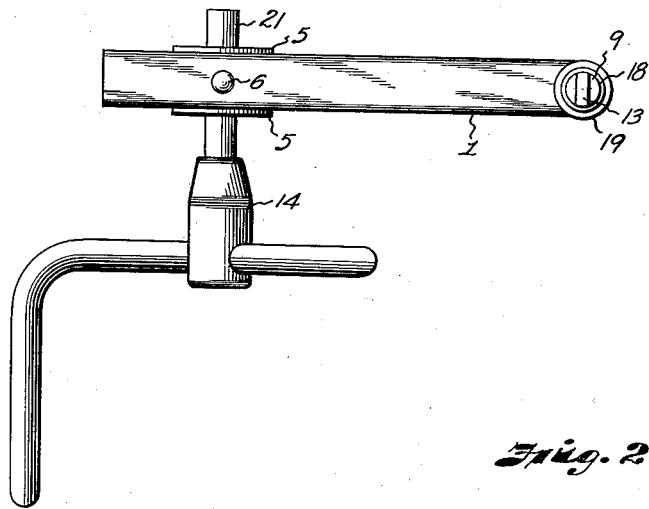
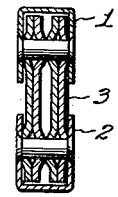
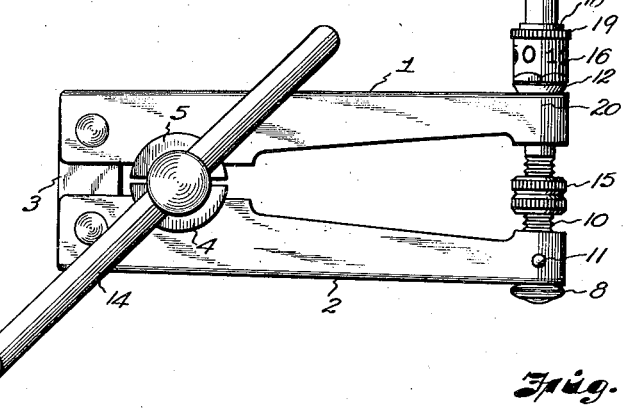
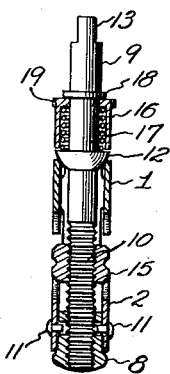
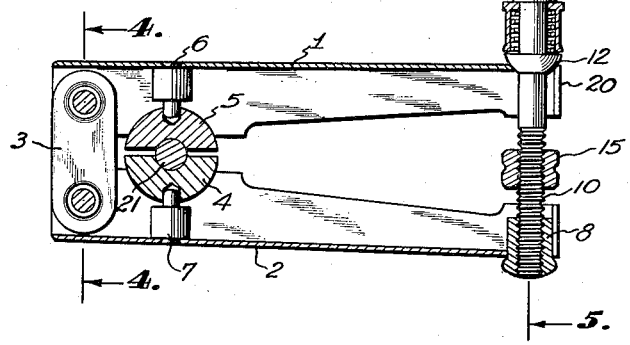
INVENTOR
Lloyd L. Davis
BY Thos. E. Scofield
ATTORNEY Patented Feb. 18, 1936

2,031,253

UNITED STATES PATENT OFFICE 2,031,253

OIL TESTING DEVICE

Lloyd L. Davis, Ponca City, Okla., assignor to Continental Oil Company, Ponca City, Okla., a corporation of Delaware Application November 14, 1935, Serial No. 49,795

2 Claims. (Cl. 265—10)

My invention relates to oil testing devices, and more particularly, to a device for measuring the film strength and/or oiliness of lubricants.

Devices of this character have been in the past relatively bulky so as to render their transportation from one point of desired operation to another a relatively burdensome task.

It is an object of my invention to provide a portable hand operated testing device for determining the relative oiliness values of different lubricants with respect to any predetermined bearing pressure and for determining the film strength of a lubricant.

It is another object of my invention to provide a portable hand operated testing device for the purposes stated capable of creating bearing pressures in excess of 10,000 pounds per square inch.

It is a further object of my invention to provide a lubricant film strength and oiliness testing device which is sufficiently light, compact and simple in construction to be easily carried by an operator from place to place.

Other and further objects of my invention will appear from the following specification and appended claims.

In general, I have provided a pair of elongated members hingedly connected at one end to form a device similar in construction to an ordinary nut cracker and provided at the other end with operating means for drawing the members together. A bearing is provided in the beams adjacent the hinged end for the reception of a rotatable shaft. The operating mechanism at the opposite end of the members is constructed with a scale by which the pressure exerted on the bearing may be determined while a handle is provided adapted to fit either the shaft of the operating mechanism or the shaft journalled in the bearing. Alternatively, a combined torque applicator and measuring device may be used to rotate the journalled shaft when determining the oiliness of different lubricants.

In the accompanying drawing which forms part of the instant specification and is to be read in conjunction therewith and in which like numbers refer to like parts throughout the various views:

Figure 1 is a plan view of the oil testing device of my invention.

Figure 2 is a side elevation of the device shown in Figure 1.

Figure 3 is a sectional elevation of the device shown in Figure 1.

Figure 4 is a sectional view taken on the line 4—4 of Figure 3.

Figure 5 is a sectional view taken on the line 5—5 of Figure 3.

More particularly referring now to the drawing, a pair of elongated beam members 1 and 2 are hingedly connected by links 3. The beam members are formed with recess portions adjacent the links 3 for the reception of bearing blocks 4 and 5. The beam members have secured thereto pins 6 and 7 which are adapted to position the bearing blocks 4 and 5 in the recess. A threaded bearing bushing 8 is adapted to seat in an appropriate recess in one of the elongated members. A shaft 9, the lower end of which is screw threaded at 10, is adapted to threadedly engage the bearing bushing 8 which may be secured to the lower elongated member 2 by means of pins 11.

Integral with the shaft 9 is a thrust collar 12. The upper end of shaft 9 is provided with a flattened portion 13 adapted to receive a socket wrench 14. A nut 15 is adapted to be positioned upon screw threaded portion 10 of the shaft 9 to limit the travel of the screw threaded portion 10 into the bushing 8. A graduated sleeve 16 is positioned around shaft 9 and is urged upwardly by a spring 17 against a collar 18. The friction which exists between the top of sleeve 16 and collar 18 is constant and is determined by the action of spring 17. The upper end of sleeve 16 is provided with a narrow portion 19 enabling the shaft 9 to be rotated through the slip coupling between the sleeve and the shaft. A suitable calibration point such as a scribe mark 20 upon beam 1 is provided. A shaft 21, one end of which is formed with a flattened portion similar to portion 13 of shaft 19, is adapted to be embraced between bearings 4 and 5.

In operation, when it is desired to test the oiliness or film strength of a lubricant, a pair of bearing blocks 4 and 5, and a shaft 21 are assembled in the position shown in Figure 3. The shaft 9 is then rotated by means of knurled, calibrated sleeve 16. As the threaded portion 10 of the shaft 9 screws downwardly, beams 1 and 2 will be drawn together, it being observed that collar 12 bears against beam 1 and bushing 8 is secured to beam 2. The drawing of the beams together will clamp the bearing blocks around the shaft 21. When the clamping action is such that the friction existing between sleeve 16 and collar 18 is overcome, the sleeve will slip. The rotation is continued until the zero mark upon the sleeve 16 is in line with the scribe mark 20 upon beam 1. It is understood that the oil to be tested has previously been placed between shaft 1 and the bearing blocks 4 and 5. The shaft 1 may be of brass or the like and the bearing blocks may be of steel. Any suitable pressure may be applied by means of the socket wrench 14. The arrangement may be such that each calibration may represent a pressure of one thousand pounds per square inch. It will be understood, of course, that the device may be calibrated in any desired manner, depending upon the pitch of the screw threads of threaded portion 10 and the length of the beams 1 and 2. Pressure is applied in successive increments by means of the socket wrench 14 which is then removed and fitted upon the shaft 21 which is rotated to ascertain the resistance to movement. When sufficient pressure is applied to break the film, a reading may be taken upon the calibrated sleeve 16. It will be understood that, as the shaft 15 is rotated by means of the socket wrench and flattened portion 13, the sleeve will turn with the shaft.

By means of my construction a zero starting point from which to take readings may always be obtained, irrespective of the thickness of the bearing blocks and the shaft.

Having thus described my invention, what I claim is:

1. A portable lubricant testing device comprising in combination a pair of elongated members having one pair of respective ends thereof hingedly connected, recesses formed in said members adjacent the points of said connections, means forming a bearing disposed in said recesses, a shaft journaled in said means, a member having screw threaded engagement with the free end of one of said members, said screw threaded member being provided with a collar adapted to engage the other of said members, a graduated sleeve frictionally positioned on said screw threaded member for initially rotating the same to bring said bearing means into contact with said shaft and means for rotating said screw threaded member to clamp said bearing means against said shaft.

2. A portable lubricant testing device comprising in combination a pair of elongated members having one pair of respective ends thereof hingedly connected, recesses formed in said members adjacent the points of said connections, means forming a bearing disposed in said recesses, a shaft journaled in said means, a member having screw threaded engagement with the free end of one of said members, said screw threaded member being provided with a collar adapted to engage the other of said members, a graduated sleeve frictionally positioned on said screw threaded member for initially rotating the same to bring said bearing means into contact with said shaft, means for rotating said screw threaded member to clamp said bearing means against said shaft, and a stop positioned on said screw threaded member adapted to engage said elongated member with which said screw threaded member has threaded engagement for preventing overloading and springing of said elongated members.

LLOYD L. DAVIS.